United States Patent
Augst et al.

(10) Patent No.: US 11,275,372 B2
(45) Date of Patent: Mar. 15, 2022

(54) DEVICE FOR CONTROLLING LONGITUDINAL GUIDANCE OF A VEHICLE DESIGNED TO BE DRIVEN IN AN AT LEAST PARTLY AUTOMATED MANNER

(71) Applicant: Bayerische Motoren Werke Aktiengesellschaft, Munich (DE)

(72) Inventors: Alexander Augst, Munich (DE); Reiner Friedrich, Grasbrunn (DE); Claus Dorrer, Munich (DE)

(73) Assignee: Bayerische Motoren Werke Aktiengesellschaf, Munich (DE)

( * ) Notice: Subject to any disclaimer, the term of this patent is extended or adjusted under 35 U.S.C. 154(b) by 196 days.

(21) Appl. No.: 16/118,881

(22) Filed: Aug. 31, 2018

(65) Prior Publication Data
US 2018/0373244 A1    Dec. 27, 2018

Related U.S. Application Data

(63) Continuation of application No. PCT/EP2017/054322, filed on Feb. 24, 2017.

(30) Foreign Application Priority Data

Mar. 2, 2016   (DE) ...................... 10 2016 203 398.0

(51) Int. Cl.
*B60W 60/00* (2020.01)
*G05D 1/00* (2006.01)
(Continued)

(52) U.S. Cl.
CPC ........... *G05D 1/0061* (2013.01); *B60N 3/063* (2013.01); *B60W 30/10* (2013.01); *B60W 30/14* (2013.01);
(Continued)

(58) Field of Classification Search
CPC .... G05D 1/0061; B60W 30/10; B60W 50/16; B60W 50/08; B60W 30/14; B60W 50/12;
(Continued)

(56) References Cited

U.S. PATENT DOCUMENTS

2013/0261889 A1* 10/2013 Sekine ................ B60W 50/085
701/36
2014/0088814 A1    3/2014 You et al.
(Continued)

FOREIGN PATENT DOCUMENTS

CN      103661364 A     3/2014
CN      104203628 A    12/2014
(Continued)

OTHER PUBLICATIONS

English Translation: Biggel, EP 2604462 A1, Jun. 2013, European Patent Publication (Year: 2013).*

(Continued)

*Primary Examiner* — Nadeem Odeh
(74) *Attorney, Agent, or Firm* — Crowell & Moring LLP

(57) ABSTRACT

A device is provided for controlling longitudinal guidance of a vehicle designed to be driven in an at least partly automated manner. The vehicle includes an actuation element for having a driver control longitudinal guidance, the actuation element being blockable within predefined limit positions in accordance with a variable representing the degree of automation of the vehicle and a first condition. The actuation element can be unblocked in accordance with the variable representing the degree of automation of the traveling vehicle and at least one second condition.

17 Claims, 2 Drawing Sheets

(51) Int. Cl.
  *B60W 30/10* (2006.01)
  *B60W 50/16* (2020.01)
  *B60W 50/08* (2020.01)
  *B60N 3/06* (2006.01)
  *B60W 30/14* (2006.01)
  *B60W 50/12* (2012.01)
  *B60W 40/08* (2012.01)

(52) U.S. Cl.
  CPC ............ *B60W 50/08* (2013.01); *B60W 50/12* (2013.01); *B60W 50/16* (2013.01); *B60W 60/005* (2020.02); *B60W 60/0051* (2020.02); *B60W 60/0053* (2020.02); *B60W 2040/0872* (2013.01); *B60W 2540/10* (2013.01); *B60W 2540/103* (2013.01); *B60W 2540/22* (2013.01); *B60W 2540/26* (2013.01)

(58) Field of Classification Search
  CPC ......... B60W 2540/10; B60W 2540/26; B60W 2540/103; B60W 2040/0872; B60W 2540/22; B60W 2540/221; B60W 60/0051; B60W 60/005; B60W 60/0053; B60N 3/063
  USPC ......................................................... 701/23
  See application file for complete search history.

(56) References Cited

U.S. PATENT DOCUMENTS

| | | | | |
|---|---|---|---|---|
| 2014/0148988 | A1* | 5/2014 | Lathrop | B60W 50/14 701/23 |
| 2014/0347458 | A1* | 11/2014 | Tijerina | B60K 28/06 348/77 |
| 2015/0006014 | A1 | 1/2015 | Wimmer et al. | |
| 2015/0032321 | A1 | 1/2015 | Wimmer et al. | |
| 2015/0253804 | A1* | 9/2015 | Baur | G05G 1/40 180/329 |
| 2015/0283998 | A1* | 10/2015 | Lind | B60W 30/17 701/23 |
| 2016/0251018 | A1* | 9/2016 | Schnieders | B60W 50/082 701/23 |
| 2016/0303972 | A1 | 10/2016 | Kuehne | |
| 2017/0017233 | A1* | 1/2017 | Ichikawa | B60W 40/00 |
| 2017/0174163 | A1* | 6/2017 | Korthauer | B60R 21/01552 |
| 2018/0017969 | A1* | 1/2018 | Nagy | B60W 30/182 |
| 2018/0088572 | A1* | 3/2018 | Uchida | B60W 10/18 |

FOREIGN PATENT DOCUMENTS

| | | |
|---|---|---|
| DE | 10 2008 054 621 A1 | 6/2010 |
| DE | 10 2008 054 622 A1 | 6/2010 |
| DE | 10 2008 054 625 A1 | 6/2010 |
| DE | 10 2008 054 626 A1 | 6/2010 |
| DE | 10 2010 039 375 A1 | 2/2012 |
| DE | 10 2010 039 643 A1 | 2/2012 |
| DE | 10 2014 209 071 A1 | 11/2014 |
| DE | 10 2013 222 265 A1 | 4/2015 |
| DE | 10 2013 019 141 A1 | 5/2015 |
| DE | 10 2014 206 960 A1 | 10/2015 |
| EP | 2 604 462 A1 | 6/2013 |
| EP | 2604462 A1 * | 6/2013 ............ B60N 3/063 |
| JP | 2006132388 A * | 5/2006 |
| WO | WO 2005/105508 A1 | 11/2005 |
| WO | WO 2013/117309 A1 | 8/2013 |

OTHER PUBLICATIONS

English Translation: Isomura, JP 2006132388, May 2006, Japanese Patent Publication (Year: 2006).*
Google English Machine Translation of Paragraph 56 of German Patent Document DE 102016203398 A1 corresponding to the German Publication of the Present Application, Sep. 7, 2017, German Patent Office Publication (Year: 2017).*
International Search Report (PCT/ISA/210) issued in PCT Application No. PCT/EP2017/054322 dated Jun. 16, 2017 with English translation (six (6) pages).
German-language Written Opinion (PCT/ISA/237) issued in PCT Application No. PCT/EP2017/054322 dated Jun. 16, 2017 (seven (7) pages).
German-language Search Report issued in counterpart German Application No. 102016203398.0 dated Feb. 28, 2017 with partial English translation (ten (10) pages).
Chinese-language Office Action issued in Chinese Application No. 201780010776.3 dated Jul. 29, 2020 with English translation (20 pages).

* cited by examiner

DEVICE FOR CONTROLLING LONGITUDINAL GUIDANCE OF A VEHICLE DESIGNED TO BE DRIVEN IN AN AT LEAST PARTLY AUTOMATED MANNER

CROSS REFERENCE TO RELATED APPLICATIONS

This application is a continuation of PCT International Application No. PCT/EP2017/054322, filed Feb. 24, 2017, which claims priority under 35 U.S.C. § 119 from German Patent Application No. 10 2016 203 398.0, filed Mar. 2, 2016, the entire disclosures of which are herein expressly incorporated by reference.

BACKGROUND AND SUMMARY OF THE INVENTION

The invention relates to a device for controlling the longitudinal guidance of a vehicle that is designed to be driven in an at least partly automated manner, wherein an actuation element can be blocked within predefined position limits in accordance with a degree of automation of the driving and in accordance with a first condition. The invention further relates to a method for controlling a pedal system and to a non-transitory computer-readable medium.

Vehicles are increasingly being equipped with driver assistance functions that permit supported, partly automated, highly automated or completely automated driving, such as to relieve the driver of routine tasks or to support the driver in critical situations. The greater the degree of automation, the greater the demands on the sensors, actuators and computing units that support the driving function. For reasons of safety, such as in the event of an unsafe state or if a driving function does not work in the way the driver expects, but also owing to a not yet fully developed set of rules governing the assumption of responsibility in the event of an accident, the driver of this type of vehicle therefore must be able to take control of driving the vehicle within a short period of time. In this context, the problem of a so-called control-resumption request is known in the form of graphical or acoustic driver information that appears when a driver assistance system is experiencing a malfunction or has reached its limits.

For example, driver assistance functions of this type can actively engage in or at least partly assume the longitudinal guidance or in the lateral guidance of the vehicle. Numerous variants of distance-dependent speed regulation functions (adaptive cruise control) and steering assistants and/or congestion assistants are known. Driver assistance functions can assume a multitude of driving tasks, including highly automated or automated driving. Some systems of this type offer partly highly varied degrees of automation. The degree of automation can vary significantly within a route as a result of diverse boundary conditions.

During the active control by driver assistance functions of this type, the driver is no longer required, sometimes for longer periods of time, to actively actuate the accelerator pedal or the brake pedal himself for the longitudinal guidance of the vehicle, maintain a particular pedal angle or track the pedal angle due to a change in the gradient of the roadway or the speed of a vehicle traveling ahead. This results in the disadvantage that the driver's foot must remain ready to act in an uncomfortable position for longer periods of time. Without special measures, the driver's foot has to often hover in a cramped position above one of the pedals. Alternatively, the foot can be angled or rested next to the pedals, which impedes a quick reaction when a necessary actuation of a particular pedal must be made. This also increases the risk that the driver could mistake the acceleration and brake pedals in a surprising situation. Moreover, the vehicle's driver can (may) also sleep at the wheel during highly automated or fully automated driving. In this case, the risk of inadvertently actuating one of the pedals increases.

An accelerator pedal module that performs the additional function of "foot rest," in which the accelerator pedal module itself serves directly as a foot rest for the driver's foot, is known from each of the German patent documents DE 10 2008 054 621 A1, DE 10 2008 054 622 A1, DE 10 2008 054 625 A1 and DE 10 2008 054 626 A1. This corresponding basic principle is solved structurally in different ways in the aforementioned documents. For example, DE 10 2008 054 621 A1 proposes operatively connecting a friction element to a pedal element of the accelerator pedal module. The friction element is arranged on a shaft journal of the pedal element. In order to structurally implement the accelerator pedal module, DE 10 2008 054 622 A1 proposes that the pedal element of the accelerator pedal module has a pedal arm, on which a spring, in particular a tension spring or a compression spring, is provided. DE 10 2008 054 621 A1 provides implementing the additional function of the accelerator pedal module as a foot rest by a section-by-section modification to the force/path characteristic curve of the accelerator pedal module. DE 10 2008 054 626 A1 provides that the pedal element of the accelerator pedal module has a swing arm, which is connected to a foot rest functional element or is integrated into the foot rest functional element. Common to all variants is the fact that the additional function is activated when an automatic control is activated, especially when an automatic speed control is activated. Furthermore, the additional function of "foot rest" can also be combinable with a stop-and-go function or with environmental functions, such as an environmental mode for reducing consumption and pollution, and with camera systems.

It is desirable to provide an accelerator pedal module and a method that ensures improved comfort for the driver on the one hand and increased safety on the other hand and that is functionally improved.

This problem is solved by an accelerator pedal module, a method for controlling a pedal module and a non-transitory computer-readable medium according to the features of the independent claims. Advantageous configurations are found in the dependent claims.

The invention proposes a device for controlling the longitudinal guidance of a vehicle that is designed to be driven in an at least partly automated manner and that comprises at least one actuation element for controlling the longitudinal guidance by a driver, wherein the at least one actuation element can be blocked within predefined position limits in accordance with a variable representing the degree of automation of the driving of the vehicle and in accordance with a first condition. The device is distinguished by the fact that the blocking of the actuation element can be suspended in accordance with the variable representing the degree of automation of the driving of the vehicle and a second condition.

The device can include a pedal module or can be installed together with a pedal module. In particular, the actuation element is a pedal that can be actuated by the driver's foot. In particular, the pedal of the accelerator pedal module is an accelerator pedal for controlling the engine output of the vehicle. However, the pedal of the accelerator pedal module can also be a brake pedal or a combined pedal that makes it possible both to control the acceleration and to slow down the vehicle. Alternatively, it can also be an actuation element that can be actuated by the driver's hand, e.g., a joystick, a so-called "hand throttle." The actuation element is preferably configured for substantially continuous control of the longitudinal dynamics of the vehicle. For example, it is an accelerator pedal or a manual actuation element for continuous control, especially readjustment, of vehicle velocity.

The device can be configured such that at least two first conditions must be determined and verified in each instance. Accordingly, the device can be configured such that at least two second conditions must be determined and verified in each instance.

The invention allows a pedal of the accelerator pedal module to be blocked at a particular angle during a driving function provided for at least partly automated driving, wherein it is possible to rest the driver's foot on the pedal in question without unintentionally actuating the pedal. This function of the "foot rest" does not occur immediately upon activating the driving function, but rather only once a particular degree of automation has been achieved and, preferably, after it has additionally been verified that a (particular) user action was or is detected and/or recognized as sufficient during a predetermined interval of time before, or at the moment when, the degree of automation is achieved. The latter represents the first condition.

The user action is preferably a particular user action by the driver. A particular user action in this instance can be understood to be an action by the user involving at least one particular actuation element of the vehicle, particularly to control the longitudinal guidance and/or lateral guidance of the vehicle. Furthermore, the particular user action by the driver can refer to a combination of actions by the driver involving at least two different actuation elements of the vehicle, particularly within a particular (narrowly defined) interval of time.

The verification of the particular user action as the first condition can include, for instance, whether the pedal had not been actively actuated and/or whether there was no contact between the driver's foot and the pedal for the predetermined interval of time before the moment the degree of automation is achieved. Moreover, the user action can also be a particular control gesture by the driver, which is detected using control gesture recognition means and which is associated with the driving of the vehicle. For example, the user action can be a confirmation of vehicle information that was displayed in connection with a (current or upcoming) partially automated or highly automated drive.

A particular user action can also include, for example, detecting the driver's identity and/or the driver having his or her identity (actively) detected, e.g., by biometric information. In this way, it is possible to determine that the driver is informed of the risks or conditions of an automated drive and is authorized to engage it.

The first condition can also be a setting in the vehicle carried out by the vehicle's driver, with which a desire to block the pedal during at least partly automated driving is explicitly or implicitly expressed. To this end, the driver can, for instance, actuate an actuation element or make a selection with a corresponding meaning from a context menu.

By the combination of increased safety and increased comfort for the driver of a vehicle that is configured for at least partly automated driving, the disadvantages that exist in the prior art are redressed.

In a hazardous situation, the driver can thus act or react from the foot position that is familiar to him or her from manual driving and/or from the already existing haptic contact between the foot and a particular pedal. It is also possible in this way to significantly reduce an amount of time, such as the time required for the driver to find the pedal to be actuated haptically or kinesthetically (in the event of a sudden control-resumption request by a driver assistance function). Furthermore, a sovereignty and so-called subjective safety of the driver, especially in dealing with the vehicle, during at least partly automated driving are significantly increased as a result of the invention.

The pedal module, in particular at least one pedal of the pedal module, can be equipped with at least one sensor for detecting a user action. The sensor can be designed for detecting a user action that is carried out or attempted independently of a significant change in the pedal position, e.g., the pedal angle. For example, the at least one sensor can be a (substantially) flat sensor, such as a piezoelectric or capacitive sensor, which detects the presence of the driver's foot on the associated pedal.

The term "degree of automation" should be understood in the description to mean a proportion of the driving tasks that can occur substantially automatically or a ratio of the driving tasks that can be performed automatically to the driving tasks that the driver must perform. The degree of automation can be expressed and/or represented by a qualitative or quantitative variable representing the degree of automation. In particular, the variable representing the degree of automation of the driving of the vehicle is a variable that is current, based on the current boundary conditions and/or based on the recent past and/or near future.

The actual degree of automation that can be achieved (without a significant increase in risk) by the driver assistance functions known from the prior art can be highly variable as a function of multiple boundary conditions, such as concrete traffic situations, properties of the traffic, special situations related to construction, the behavior of other road users in the vicinity, the quality of navigation data, the (typically insufficient) real-time capability of vehicle-external data, etc. For example, the variable representing the degree of automation can be assumed to be high when the degree of automation increases and has exceeded a particular value and/or can be assumed to be low when it decreases and has fallen below a predetermined value. It is especially preferable for a cumulative value of the degree of automation over time to be taken into account.

Measurements or category values defined by the German Association of the Automotive Industry (VDA), for example, can serve as variables representing the degree of automation. For example, these can be classes or category values for the following degrees of automation:

A1: supported driving;
A2: partly automated driving;
A3: highly automated driving;
A4: automatic driving;
A0: degree of automation unknown or low-confidence statements.

In addition, the variable representing the degree of automation takes into account particular aspects of the achievable and/or appropriate degree of automation individually, selectively or in particular combinations. For instance, a variable representing the degree of automation of the drive can also be considered in the control unit selectively, with reference to at least two different aspects of the automation of the movement of the vehicle and/or for two or more different driver assistance functions of the vehicle, e.g., with regard to: a longitudinal guidance of the vehicle and/or a lateral guidance of the vehicle and/or performing a lane change and/or performing a passing maneuver and/or driver information, especially in connection with the vehicle guidance.

All of the features of the invention discussed here can be applied separately and differently for different aspects of the automation.

The variable representing the degree of automation can also be determined depending on the specifications of the driver and/or the driver's previously stored actuation history and/or parameters that are stored in a back end and accessible by the vehicle or other practical criteria (e.g., type of road, etc.), and/or the variable can take these criteria into account.

Particularly preferably, the device according to the invention is configured to determine a variable representing the degree of automation of the vehicle for the current or, especially in the interval of time of +/−2 seconds, predicted degree of automation. In particular, this can also take place for a near future (e.g., in a range between 1 and 30 seconds). In particular, the pedal system can be configured to detect, especially read, a value of the degree of automation from further devices within or outside of the vehicle.

Where the present description mentions blocking, this should be understood to be an at least partially mechanical locking of the pedal and/or a restriction of movement, e.g., within particular position limits or pedal angle values. A significantly increased resistance to movement in the pedal also falls under the term "locking." The predetermined position limits and/or the blocking can affect one or more degrees of freedom of the pedal. For example, the pedal and/or the mechanism for blocking is configured in such a way that it is retained substantially within the predetermined position limits by one or more actuators. The actuators can be, for example, those actuators that serve to provide adaptive control of so-called pedal force feedback.

As described, the predetermined position limits of the pedal are a pedal angle. Furthermore, the position can be a three-dimensional (3D) position, for example, when the pedal is not rotated about an axis to be actuated thereof but rather is slid, rocked or a parallel stroke is carried out.

At the same time the pedal is blocked, the actuation behavior of at least one (involved) pedal changes. The change in actuation behavior can occur in the pedal module as a result of the blocking and/or by a corresponding electronic control carried out at the same time. In particular, the influence the driver exerts on the longitudinal guidance of the vehicle can be considerably restricted, inhibited or limited to an emergency function.

The blocking can take the form of an electromechanical, especially electromagnetic, restriction of the movement of the pedal. Alternatively or additionally, the pedal can be held within the prescribed limits by the influence, in particular the controlled or regulated influence, of actuators. Moreover, it is possible that the opposing force of a pedal in question is varied by one or more parameters.

The first condition can thus depend upon the current degree of automation, the degree of automation determined (predicted) for the near future and a change trend in the degree of automation. The degree of automation can depend upon a particular driving profile or a driver profile. Degrees of automation can also be applied for different aspects of automating the movement of the vehicle and/or for different driver assistance functions of the vehicle relating to a longitudinal guidance and/or a lateral guidance of the vehicle.

According to the invention, the blocking of the pedal can be suspended in accordance with a variable representing the degree of automation and a second condition. For example, a blocking of the pedal for safety reasons, e.g., when the driver is sleeping during a highly automated drive, can be suspended only if the driver is sufficiently awake and alert. In a simple case, the second condition can be a setting in the vehicle that is or has been made by the driver and with which the desire to suspend the blocking of the pedal is expressed.

The second condition, i.e., determining the second condition, can in this case depend upon the first condition or can be considered dependent on a first condition.

In particular, the blocking can be suspended when the current degree of automation or the degree of automation determined for the (near) future exceeds a predetermined value. The degree of automation can then be assumed to be low enough when the degree of automation sinks in accordance with the classes or categories described above, for example, and has fallen below a particular value. The second condition can thus likewise depend upon the current degree of automation, the degree of automation determined (predicted) for the near future and a change trend in the degree of automation. Similarly, it is possible that the second condition is dependent upon a particular driving profile or driver profile.

According to an advantageous embodiment, the second condition can include a control-resumption request regarding a longitudinal guidance of the vehicle to be carried out by the driver. The control-resumption request can be generated by the vehicle, such as the system for at least partly automatic driving and/or can be communicated to the driver via a human-machine interface. This can occur, for example, as a function of a completed or expected reduction in the degree of automation and/or as a function of the currently prevailing traffic situation.

The control-resumption request can be a so-called takeover request (TOR) or a hands-on request (HOR) or an explicit request to actuate the pedal and/or a different actuation element (especially the steering wheel) of the vehicle. In the case of an HOR, the driver is requested to place his or her hands and/or feet on the respective actuation elements in order to be able to take corrective measures, if necessary.

This kind of approach can be especially practical when an "essential driving task" involving longitudinal and/or lateral guidance of the vehicle is to be performed. An essential driving task of this type can be additional acceleration desired by the driver and in relation to an already implemented by the at least partly automated driving or a slowing of the vehicle, which should be executed or carried out in addition to or in relation to the acceleration or deceleration determined by the vehicle automation system.

The second condition can depend upon an urgency of the control-resumption request and/or a criticality of a current or shortly expected traffic situation.

According to an advantageous embodiment, the first condition is designed as a user action, in particular a certain user action, which was or is detected during a predetermined interval of time before or at the moment when the degree of automation is achieved. It is especially preferred that the first condition includes the information as to whether at least one actuation element for controlling the longitudinal guidance of the vehicle and/or an actuation element for controlling the lateral guidance of the vehicle has not been actively actuated for a prescribed interval of time. This includes that there has been no foot contact or hand contact by a driver with the actuation element to control the longitudinal guidance of the vehicle and/or the actuation element for controlling the lateral guidance of the vehicle.

According to a further advantageous embodiment, the at least one first condition and/or the at least one second condition of at least one variable representing the degree of automation of the driving of the vehicle includes a particular automation for the driving of the vehicle in the near future. Here, the device can be configured to block the actuation element when a degree of automation determined for the near future (e.g., in a range between 1 and 30 seconds) exceeds a predetermined value.

According to a further advantageous embodiment, the at least one second condition includes an action by the driver that exceeds a predetermined value by the actuation element for controlling the lateral guidance of the vehicle. The device can here be configured to suspend the blocking when an action by the driver, in conjunction with the actuation element for controlling the lateral guidance of the vehicle, is detected that exceeds a predetermined value. Particularly preferably, an action by the driver can include touching, especially gripping, the actuation element for controlling the lateral guidance of the vehicle. In particular, the actuation element for controlling the lateral guidance of the vehicle can be a steering wheel of the vehicle. Furthermore, the actuation element for controlling the lateral guidance of the vehicle can also be configured as a joystick or the like. The actuation element for controlling the lateral guidance of the vehicle can be installed together with the actuation element for controlling the longitudinal guidance of the vehicle or can have the same or adjacently arranged handle surfaces.

Grasping, especially gripping, the actuation element for controlling the lateral guidance of the vehicle can be detected by at least one sensor, in particular a capacitive or inductive sensor on the actuation element. A sensor such as this also permits the detection of whether a particular value of a contact surface (gripping surface) and/or a force, in particular a gripping force by the driver, has been exceeded. Especially preferably, the device is configured to detect the driver action on a steering wheel of the vehicle and to check whether the action exceeds a predetermined value. Moreover, the device is configured to suspend a blocking of the actuation element for controlling the longitudinal guidance of the vehicle depending upon the verification of the detected driver action on the steering wheel of the vehicle.

According to a further advantageous embodiment, the at least one second condition includes a control-resumption request regarding a longitudinal guidance of the vehicle to be carried out by the driver, which can be detected by the vehicle. This kind of control-resumption request can be a request generated by a driver assistance function that is issued when the driver should take over at least the longitudinal guidance of the vehicle. A control-resumption request such as this can be issued, for example, as a function of (changed) environmental conditions or a change in the state or operating mode of a driver assistance function.

According to a further advantageous embodiment, the second condition includes a control-resumption request regarding a lateral guidance of the vehicle to be carried out by the driver of the vehicle, in particular a readiness of steering and/or a steering action. The second condition that releases the blocking of the pedal is determined when a steering wheel sensor detects a gripping force and/or a particular steering action. The readiness of steering can be detected by a so-called hands-on sensor on the steering wheel and/or with the aid of a camera arranged in the interior of the vehicle. Sensors such as these, e.g., on a capacitive basis, are known to a person skilled in the art. The steering action can be recognized by a steering angle sensor or a steering force sensor. The second condition is fulfilled, for example, when an increased gripping force that exceeds a particular value is ascertained in one or two places on the steering wheel and a simultaneous application of force on one of the pedals by the driver's foot is detected.

The device can thus be configured to suspend the blocking when it is determined using the vehicle, e.g., by a driver assistance function, that the driver, who should be ready to steer, has at least one steering action to carry out. The driver can then also be offered a possibility, with the request to carry out a (particular) steering action, of performing a corresponding longitudinal guidance of the vehicle stemming from the context of a particular maneuver.

According to a further advantageous embodiment, the at least one second condition is or includes a recognition of the willingness and/or capability by the driver to take over a driving task, in particular the longitudinal guidance of the vehicle. The willingness to take over can be recognized on the basis of a combination of multiple criteria. For example, an analysis of body gestures can be utilized for this purpose, such as a gesture for actuating the steering wheel and/or a gesture for actuating a pedal and/or a (quick) bodily movement, for instance, from a reclined posture to a ready-to-drive posture. The willingness and/or capability to take over can be established by an interior camera in the vehicle, such as when the detected hands of the driver move (quickly) to the steering wheel or grip it. The readiness to actuate the accelerator pedal module can similarly be recognized. A combination of these gestures is also possible.

Alternatively or additionally, the suspension of the blocking can be prevented in the event that the driver is not capable of taking over or also can be linked to other conditions.

The capability to take over can additionally be recognized based on driving actions by the driver. To this end, an interior camera and the like can be used as sensors. Likewise, an inability to take over can be detected on the basis of multiple critical operating errors committed by the driver.

According to a further advantageous embodiment, the at least one first condition and/or the at least one second condition is dependent on a necessity and/or handling recommendation to carry out a particular maneuver as determined by the vehicle. To this end, for example, information regarding a corresponding maneuver can be provided to the driver of the vehicle, possibly in the form of an instruction. For example, it is determined based on an assessment of the environment that any influence by the driver on the pedal can be counterproductive during a dynamic maneuver by the vehicle that is necessary for safety reasons. In such a case, the pedal is temporarily blocked. An unblocking occurs with an alternative or a safety-related operating procedure. As a further example, it can be determined based on the assessment of the environment that a particular maneuver or at least the longitudinal guidance of the vehicle during this maneuver should exceptionally be performed by the driver. In this instance, information about this maneuver is issued to the driver, for example, in the form of an instruction. A suspension of the blocking of the pedal accordingly occurs.

According to a further advantageous embodiment, the at least one first condition and/or the at least one second condition is dependent on one or more of the following parameters determined by the vehicle: attention status, viewing direction, sight accommodation of the driver, driver status detection, in particular an alertness status, sleeping status, blinking detection, microsleep detection by the driver.

The particular roadway areas and/or objects on which the driver is focused are practical when determining the attention state. Objects can be currently relevant road users, a vehicle located in front of one's own vehicle or also a vehicle driving behind one's own vehicle. Thus, it can be tested as an additional condition whether the driver is actually looking or has looked at the roadway before completely suspending the blocking and/or transitioning the pedal to a manual mode. It is also possible to check, e.g., by eye-tracking, whether the driver has looked at a roadway area and/or an object on the roadway or through a rear-view mirror when this is relevant to the actuation of the pedal.

Driver status detection includes in particular a general state of the driver that is relevant for the driving and/or his or her currently prevailing state with regard to the driving task. The pedal can be blocked when it is determined, for example, that the driver has fallen asleep or is not concentrating. Furthermore, depending on expected need for the driver's participation in the driving action, the driver can first be awakened, and the blocking of the accelerator pedal can then be suspended.

According to a further advantageous embodiment, the at least one first condition and/or the at least one second condition are provided to the computing unit of a mobile user device, which detects these at least partly with a sensor in the user device. This means that when the pedal is blocked or the blocking is suspended, information from an application (called an "app") running on a mobile user device is processed. In this way, an application of this type can evaluate the driver's bodily state as a driver parameter and expand into controlling the pedal.

In particular, the mobile user device is a user device that can be (is) taken along with the vehicle, such as a smartphone, tablet, smart watch, so-called smart glasses or smart clothing. It is especially preferred that the mobile user device be a user device that can be (is) worn on the driver's body. In particular, at least one of the driver parameters is a parameter regarding the driver's body that is detected with the sensor of the user device, such as a fatigue parameter, sleep parameter, pulse, so-called brain waves, such as alpha, beta and theta waves, or values correlating therewith. The mobile user device can include an appropriate or appropriately configured interface for exchanging data with the vehicle and/or with the device and for operating with the device, such as by the app.

According to a further advantageous embodiment, a blocking of the actuation element can be performed substantially stagelessly or at least in two stages, wherein at least one parameter of the blocking, especially at least one predetermined position limit, depends upon a qualitative and/or quantitative parameter of at least the first condition.

The blocking of the actuation element in at least two stages can be understood as at least two position limits, e.g., angular limits, at or from which the mobility of the actuation element is restricted.

A further advantageous embodiment provides that a suspension of the blocking occurs stagelessly or at least in two stages. Here, at least one parameter of the suspension of the blocking, depending upon a qualitative and/or quantitative parameter, can be related in particular to the at least one second condition. In particular, it is possible that the at least one parameter of the suspension of the blocking is designed as an interval of time, which characterizes the time before at least one first particular suspension state or a particular stage of the suspension of the blocking is achieved. In other words, a blocked pedal can also be "loosened" gradually or in delayed stages, i.e., it can be moveable or actuatable by the driver. The suspension of the blocking can occur here as a function of which second condition or combination of at least two second conditions are fulfilled and/or of a quantitative parameter of the second condition.

According to a further advantageous embodiment, the predetermined position limits for at least one automated driving mode of the vehicle lie outside of further position limits that are defined by the driver for at least partly manual driving. For example, the pedal can be pushed further toward the driver and/or can assume a different angle. In doing so, a more comfortable pedal position for a long automatic drive can be achieved. The pedal can also be (actively) moved within the predetermined position limits when in the highly automated mode, for example, to increase comfort or reduce immobility of the muscles.

According to a further advantageous embodiment, at least one of the predetermined position limits is dependent upon one or more of the following criteria: a degree of automation relevant to the current drive; a velocity range relevant to the current drive; a current seat position or seat setting by the driver; a body position or pose of the driver; the driver in question; an alertness state of a driver. In other words, the predetermined position limits of the pedal can be set in accordance with body size, seat position or as desired by the driver with regard to an automatic driving rather than at least one position that serves a purpose for the actuation of the pedal by the driver. The latter occurs in a driving mode with or without a low level of automation. The predetermined position limits can be varied before or during the automated drive. In particular, as a function of the above criteria, the pedal can be set in a mode with corresponding position limits and possibly with a massage function. In this way, the blocked pedal can improve the comfort of the driver or can be adapted to special requirements.

A further advantageous embodiment provides that the predetermined position limits are selected in terms of their angles and/or their positions such that they are located between a first position range, which brings about an acceleration of the vehicle in an at least partly manual driving mode of the vehicle, and a second position range, which brings about a deceleration of the vehicle in the at least one partly manual driving mode of the vehicle. This embodiment variant can be employed in an electrically driven vehicle, for example, in which both the acceleration and deceleration can be controlled with one pedal. In this case, the predetermined position limits during highly automated driving can lie between a position for vehicle acceleration and a position for vehicle deceleration.

Moreover, it may be practical to select the predetermined position limits to be variable. Alternatively, the predetermined position limits can be modified depending upon the vehicle acceleration. In the event that the driver takes over at least the longitudinal guidance of the vehicle, he or she can receive a more or less appropriate, adapted starting position for continuing the control of the vehicle. A largely seamless transition into the precise adjustable manual acceleration can then be carried out by the driver without an acceleration jump.

A further advantageous embodiment provides that a third condition, which is an alternative to the first condition, is checked and, if applicable, is processed instead of the first condition for the determination of whether the blocking of the pedal should be released. In particular, the alternative third condition can be utilized to check a driver identity or to control a value for driver authorization, such as the authorization to control the vehicle with the aid of a driver assistance function.

It is likewise possible that a fourth condition, which is an alternative to the second condition, is checked and, if applicable, is processed instead of the second condition for the determination of whether the blocking of the pedal should be released. The fourth condition can thus depend upon a mechanical or electromechanical influence on the pedal, steering wheel or another actuation element of the vehicle by the driver. The fourth condition can be utilized, for example, to check the driver identity or to control a value for driver authorization, such as the authorization to control the vehicle without the aid of a driver assistance function.

In this context, it is additionally possible that the third condition and/or the fourth condition depend upon a combination of predetermined force applications by the driver on the steering wheel, wherein the force applications can be detected by pattern recognition. For example, a back-and-forth movement or a defined manual influence, such as a combination of particular force applications, on the steering wheel can in this case be monitored and detected. The third condition and/or the fourth condition can additionally depend upon a combination of actuations of at least two different actuation elements of the vehicle.

According to a further embodiment, the third condition is fulfilled when a pressure exerted on the pedal by the driver's foot, in particular a certain pressure sequence or pressure direction, can be detected. In other words, the pedal can be shifted into a manual operating state or mode with a mechanical redundancy, i.e., without regard for further criteria. In this variant, this means that, when the first and/or second conditions are fulfilled at the same time, they can be overridden by the third and/or fourth conditions. Thus, a simple mechanical and/or electromechanical redundancy, especially an ASIL (automotive safety integrity level)-capable redundancy, can be implemented. The redundant fourth condition here can include a pressure, in particular repeated pressure, on the pedal that exceeds a particular force. Alternatively, a lateral force application or force acting in an opposite direction, brought about by a foot under the pedal, can represent the presence of the fourth condition.

To solve the problem, a vehicle with means for at least partly automated driving and a pedal system is further proposed, wherein the pedal system is configured in accordance with the above description. The vehicle offers the same advantages as those discussed above in connection with the pedal system according to the invention.

The invention further proposes a method for operating an at least partly automated driving of a vehicle having the device described above. The method includes the following steps: detecting a variable representing the degree of automation of the driving of the vehicle; detecting the presence of at least one first condition and/or at least one second condition; initiating the blocking of an actuation element for controlling the longitudinal guidance of the vehicle within predetermined position limits as a function of the variable representing the degree of automation of the driving of the vehicle and the at least one first condition. The method is distinguished in that the suspension of the blocking of an actuation element for controlling the longitudinal guidance of the vehicle is initiated as a function of the variable representing the degree of automation of the driving of the vehicle and the at least one second condition.

The method according to the invention offers the same advantages as those described above in connection with the pedal system according to the invention.

The method can be further developed in accordance with the description above.

Finally, a non-transitory computer-readable medium is proposed that can be loaded directly into the internal memory device of a digital computer and comprises software code segments, with which the steps of the method described here are executed when the product is running on the computer. In particular, the computer is a computer unit of the vehicle or of the pedal module. The non-transitory computer-readable medium can be stored on a memory medium, such as a USB memory stick, a DVD, a CD-ROM, a hard drive or the like. The non-transitory computer-readable medium can likewise be transmittable via a communications link (wireless or by wire).

The accelerator pedal according to the invention permits objective safety to be increased and the risk of operating errors to be decreased. Because the driver does not have to hold his or her foot as tensely by using the accelerator pedal as a foot rest during an automated driving mode, an increase in subjective safety results. Moreover, the driver's comfort is significantly improved. Another advantage is the reduction of take-over time, should control of the longitudinal guidance of the vehicle be necessary, since the foot is already located on the correct pedal before the take-over of control. A further advantage consists in that it is possible to avoid acceleration jumps during a take-over of the longitudinal guidance after a highly automated driving mode, as a result of which both driving comfort and safety are increased during vehicle driving.

Hereafter, the invention is explained in greater detail on the basis of an exemplary embodiment in the drawing.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
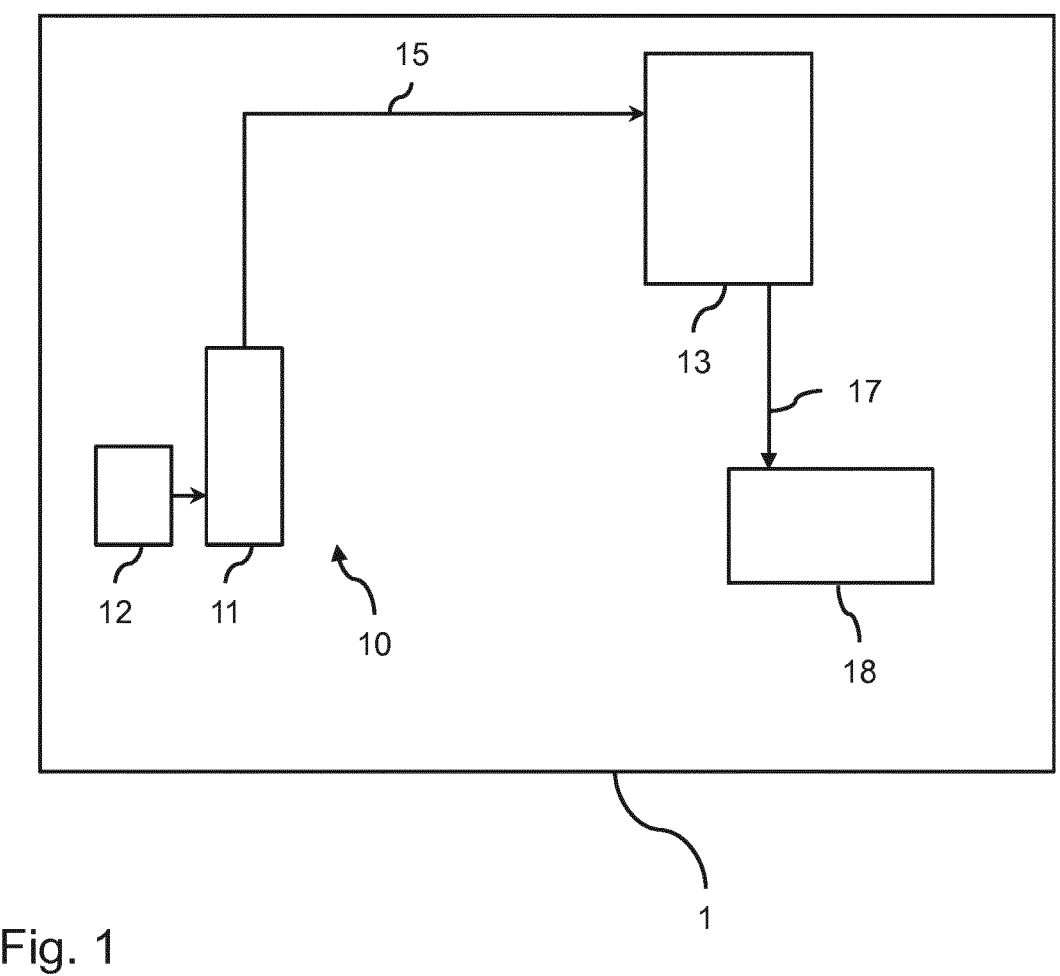
FIG. 1 is a schematic representation of a device according to the invention for controlling the longitudinal guidance of a vehicle designed to be driven in an at least partly automated manner.

FIG. 1 shows a device according to the invention in the form of a pedal module 10 for controlling the longitudinal guidance of a vehicle 1 designed to be driven in an at least partly automated manner. Only for the purposes of illustration, the pedal module 10 has a single pedal 11 as an actuation element, which serves to control the engine output, for example, and is colloquially known as the gas pedal. Alternatively, the pedal 11 can also be a brake pedal or a combined pedal that makes it possible both to control the acceleration and to slow down the vehicle.

Depending on a respective position, e.g., a pedal angle relative to a starting position, a corresponding signal 15 representing the position and/or movement of the accelerator pedal is transmitted to a computer unit 13 of the pedal module 10. The computer unit 13 is configured to process the signal 15 and to transmit a control parameter 17 as a result of the processing to a further computer unit 18 for the longitudinal guidance of the vehicle. The computer unit 18 itself is linked to systems, such as actuators, sensors and the like, which are not shown in greater detail in the figure, for the at least partly automated driving of the vehicle 1. The computer unit 18 permits a (partly) automated operation of the vehicle with different degrees of automation. The degrees of automation can exist as classes or category values, as defined by the German Association of the Automotive Industry (VDA). For example, these include:
A1: supported driving;
A2: partly automated driving;
A3: highly automated driving;
A4: automatic driving;
A0: degree of automation unknown or low-confidence statements.

If the vehicle 1 is operated with the aid of automatic speed regulation, such as cruise control (degree of automation A1) or adaptive cruise control (degree of automation A2), then the actuation of the pedal 11 by the driver of the vehicle 1 is superfluous. In order to end the automatic speed regulation at any time, for instance, in the event of a sudden dangerous situation, the driver's foot should remain as close to the pedal 11 as possible.

To provide increased comfort for the driver at the same time, the driver can leave or place his or her foot on a pedal plate of the pedal 11 when the pedal 11 is blocked and serves as a "foot rest," according to the embodiment described here.

The blocking of the pedal 11 occurs as soon as the computer unit 18 for at least partly automated driving issues the information indicating that the degree of automation is sufficiently high and that it has been determined as a condition at the same time that, for example, the pedal 11 has not been actively actuated and/or that there has been no foot contact with the pedal 11 by the driver for a predetermined interval of time. The first condition can also be a setting in the vehicle that the blocking of the pedal 11 during an automated drive with an insufficiently high degree of automation is desired. That the driver will probably not be required to actuate the pedal during the next, relatively long period of time can be considered as a further criterion. In this instance, the pedal 11 can be used as a foot rest.

The device can be configured such that a variable representing the degree of automation of the driving of the vehicle 1 and the at least one first condition and/or the at least one second condition for blocking and/or for suspending the blocking of the at least one pedal 11 must lie within predetermined limits at the same time and/or within a predefined time interval, e.g., from 1 to 5 seconds.

When transitioning from manual driving into the (partly or highly) automated driving mode, a haptic effect or vibration is generated by an actuator 12 of the pedal 11 so that the driver can perceive the mode transition. If the driver does not want to block the pedal 11, then brief pressure on the pedal or performing a particular other actuation action during the mode change is sufficient to prevent the blocking of the pedal 11. It is practical to visualize the mode change or additionally emit a tone.

Along with the transition of the pedal 11 into the (partly or highly) automated mode, the pedal 11 leaves its position used for manual driving and transforms into the previously described foot rest. The foot rest can be adjusted automatically or according to the driver's wishes so as to achieve a seat position that is comfortable for the driver.

This adjustment remains in this case without any effect on the longitudinal guidance of the vehicle, in particular vehicle acceleration.

If a driver is required to take over a driving task, a signal, e.g., a so-called take-over request (TOR) or a hands-on request (HOR) or a foot-on request (FOR), is sent to the driver of the vehicle by the computer unit 18. When the driver then grips the steering wheel, the blocking is suspended. The suspension of the blocking can occur immediately or in stages. Thus, the pedal 11 is fully or partly released to resume control of the acceleration or deceleration of the vehicle.

During a mode change from automated driving to manual mode, a further haptic effect by the actuator 12 occurs on the pedal 11. Preferably, this haptic effect can be differentiated from the haptic effect that occurs on the pedal 11 during the transition from manual mode to automated driving. This ensures that the driver has sensed the mode change, and so a sudden, excessively large acceleration or deceleration due to the foot resting on the pedal 11 can be avoided.

Furthermore, the driver can also bring about the suspension of the blocking of the pedal without a control-resumption request. This happens, for example, by pressing together on the steering wheel grip with both hands or by another predefined effect or predefined force or combination thereof. In particular, other actuation elements can be actuated or a function can be selected from a pull-down menu via a human-machine interface.

Figure 2:
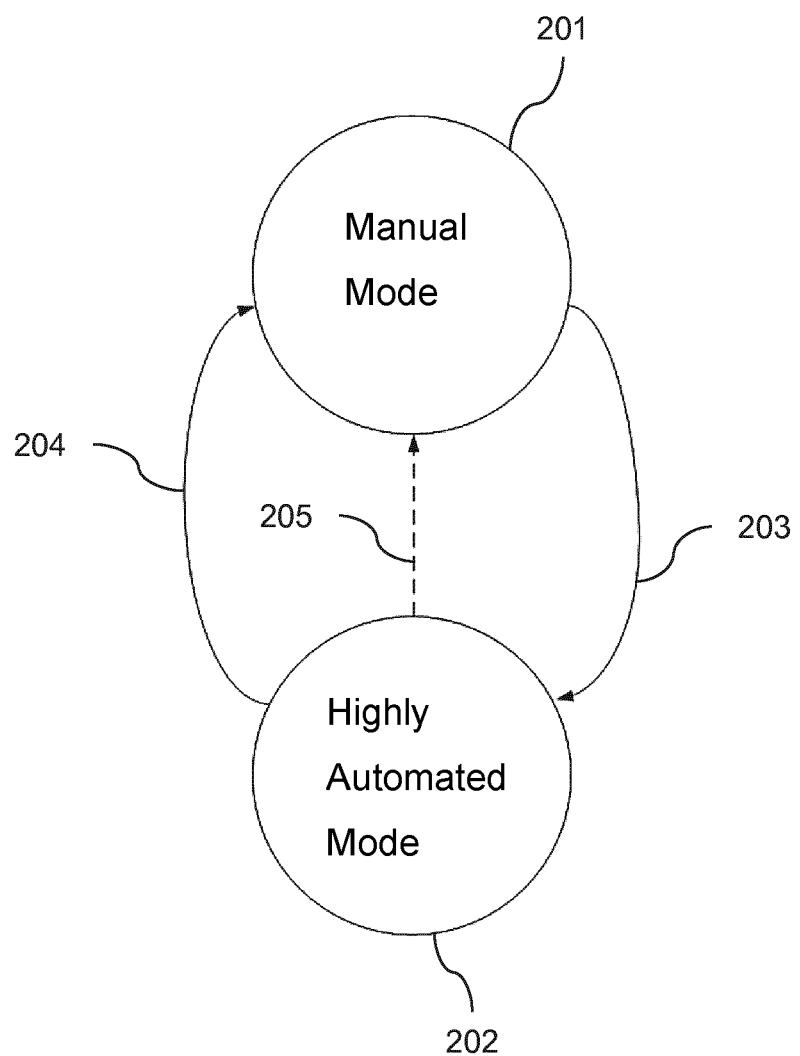
FIG. 2 is a state diagram that illustrates the control according to the invention of the accelerator pedal on the basis of an exemplary embodiment.

FIG. 2 shows an exemplary embodiment in the form of a simplified state diagram. The manual mode is identified as the first state with reference sign 201; the automated mode is identified as the second state with reference sign 202. The reference signs 203, 204 and 205 represent state transitions between the first state 201 of the manual mode and the second state 202 of the automated mode.

The manual mode serves to control the acceleration and/or deceleration of the vehicle by the driver by the deliberate actuation of the pedal 11. In other words, the pedal 11 is pressed down by the driver in the conventional manner in order to increase engine output, for example. In the highly automated mode, the pedal is blocked or can be moved within particular position limits. Thus, the pedal can be used as an ergonomic foot rest, wherein an application of force on the blocked pedal has no effect on the longitudinal guidance of the vehicle, especially acceleration.

The transition 203 from the first state 201 of the manual mode into the second state 202 of the automated driving occurs in dependence upon the degree of automation of the driving and upon a first condition. At this point, it is verified whether the pedal had not been actively actuated and/or whether there was no contact between the driver's foot and the pedal for a predetermined interval of time. The first condition can also be a setting in the vehicle that the blocking of the pedal 11 during an automated drive with an insufficiently high degree of automation is desired.

The transition 204 from the second state 202 of the automated driving into the first state 201 of the manual driving occurs in dependence upon the degree of automation of the driving (e.g., the current degree of automation or the degree of automation determined for the future exceeds a predetermined value) and when a second condition is fulfilled. The second condition can include, for instance, a control-resumption request regarding a longitudinal and/or lateral guidance of the vehicle to be carried out by the driver, such as a braking process or steering intervention on very bendy roads.

The state transition 205 permits a transition from the second state 202 of automatic driving to the first state 201 of the manual mode with the aid of a redundant condition, e.g., when the automation stops or fails. If an alternative or redundant condition such as this is fulfilled, then it takes precedent over the state transition 204. The alternative or redundant condition can be, for example, a back-and-forth movement and/or a specifically defined influence on the steering wheel. The alternative or redundant condition can likewise be a combination of actuations of two or more different actuation elements of the vehicle.

A further alternative condition involves a particular pressure exerted on the pedal 11 by the driver's foot or a pressure sequence or pressure direction on the pedal 11. In particular, state transitions relevant to safety can be created in this way.

LIST OF REFERENCE SIGNS

1 Vehicle
10 Pedal module
11 Pedal
12 Actuator
15 Signal (representing the position/movement of the pedal)
17 Control parameter
18 Computer unit
201 First state
202 Second state
203 State transition
204 State transition
205 State transition The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for controlling longitudinal guidance of a vehicle that is configured to be driven in an at least partly automated manner, the device comprising:
    a first actuation element configured to control the longitudinal guidance by a driver, wherein the first actuation element is blocked within predefined position limits in accordance with a variable representing a degree of automation of driving of the vehicle and in accordance with a first condition, and
    a processor configured to output a control signal for blocking of the first actuation element,
    wherein the blocking of the first actuation element is suspended in accordance with the variable representing the degree of automation of the driving of the vehicle and a second condition, and
    wherein the first condition includes a determination that the first actuation element has not been actively actuated for a fixed time interval before a moment when the degree of automation is achieved.

2. The device as claimed in claim 1, wherein at least one of the first condition and the second condition includes that the variable representing the degree of automation of the driving of the vehicle indicates a particular automation for the driving of the vehicle at a future time.

3. The device as claimed in claim 1, further comprising a second actuation element configured to control lateral guidance of the vehicle, wherein the second condition includes that an action performed by the driver on the second actuation element for controlling the lateral guidance of the vehicle exceeds a predetermined value.

4. The device as claimed in claim 3, wherein the first actuation element is installed together with the second actuation element or wherein the first actuation element and the second actuation element have a same or adjacently arranged handle surfaces.

5. The device as claimed in claim 1, wherein the second condition includes a control-resumption request regarding the longitudinal guidance of the vehicle to be carried out by the driver, which is detected by the vehicle.

6. The device as claimed in claim 1, wherein the second condition includes a control-resumption request regarding lateral guidance of the vehicle to be carried out by the driver of the vehicle, including at least one of a readiness of steering and a steering action.

7. The device as claimed in claim 1, wherein the second condition is a recognition of at least one of willingness and capability by the driver to take over a driving task.

8. The device as claimed in claim 1, wherein at least one of the first condition and the second condition is dependent on at least one of a necessity and a handling recommendation to carry out a particular maneuver as determined by the vehicle.

9. The device as claimed in claim 1, wherein at least one of the first condition and the second condition is dependent on one or more of the following parameters determined by the vehicle:
    attention status, viewing direction, and sight accommodation of the driver;
    driver status detection, including alertness status, sleeping status, blinking detection, and microsleep status of the driver.

10. The device as claimed in claim 1, wherein at least one of the first condition and the second condition is detected by a sensor in a mobile user device and provided to a computing unit of the mobile user device.

11. The device as claimed in claim 1, wherein the blocking of the first actuation element is stageless, wherein a parameter of the blocking is dependent on at least one of a qualitative and a quantitative parameter of the first condition.

12. The device as claimed in claim 1, wherein the predefined position limits for an automated driving mode of the vehicle are different from further position limits that are defined for at least partly manual driving.

13. The device as claimed in claim 12, wherein at least one of the predefined position limits is dependent on one or more of the following criteria:
    a degree of automation relevant to a current drive;
    a velocity range relevant to the current drive;
    a current seat position or seat setting of the driver;
    a body position or pose of the driver;
    the driver;
    an alertness state of the driver.

14. The device as claimed in claim 12, wherein the predefined position limits are selected in terms of at least one of their angles and positions such that they are located between a first position range, which brings about an acceleration of the vehicle in an at least partly manual driving mode of the vehicle, and a second position range, which brings about a deceleration of the vehicle in the at least partly manual driving mode of the vehicle.

15. An apparatus configured to provide at least partly automated driving of a vehicle, the apparatus comprising:
    a pedal module including an actuation element configured to control longitudinal guidance by a driver, wherein the actuation element is blocked within predefined position limits in accordance with a variable representing a degree of automation of driving of the vehicle and in accordance with a first condition, and
    a processor configured to output a control signal for blocking of the actuation element, wherein the blocking of the actuation element is suspended in accordance with the variable representing the degree of automation of the driving of the vehicle and a second condition, and wherein the first condition includes a determination that the actuation element has not been actively actuated for a fixed time interval before a moment when the degree of automation is achieved.

16. A method for operating a vehicle that is configured to be driven in an at least partly automated manner, the vehicle including an actuation element configured to control longitudinal guidance of the vehicle by a driver, wherein the actuation element is blocked within predefined position limits in accordance with a variable representing a degree of automation of driving of the vehicle and in accordance with a first condition, wherein the first condition includes a determination that the actuation element has not been actively actuated for a fixed time interval before a moment when the degree of automation is achieved, wherein blocking of the actuation element is suspended in accordance with the variable representing the degree of automation of the driving of the vehicle and a second condition, the method comprising:

- detecting the variable representing the degree of automation of the driving of the vehicle;
- detecting fulfillment of at least one of the first condition and the second condition;
- initiating the blocking of the actuation element for controlling the longitudinal guidance of the vehicle within the predefined position limits as a function of the variable representing the degree of automation of the driving of the vehicle and the first condition; and
- initiating suspension of the blocking of the actuation element for controlling the longitudinal guidance of the vehicle as a function of the variable representing the degree of automation of the driving of the vehicle and the second condition.

17. A non-transitory computer-readable medium storing a computer program that is executable by a computer for operating an at least partly automated driving of a vehicle that is configured to be driven in an at least partly automated manner, the vehicle including an actuation element configured to control longitudinal guidance of the vehicle by a driver, wherein the actuation element is blocked within predefined position limits in accordance with a variable representing a degree of automation of driving of the vehicle and in accordance with a first condition, wherein the first condition includes a determination that the actuation element has not been actively actuated for a fixed time interval before a moment when the degree of automation is achieved, wherein blocking of the actuation element is suspended in accordance with the variable representing the degree of automation of the driving of the vehicle and a second condition, the computer when executing the computer program is configured to perform steps comprising:

- detecting the variable representing the degree of automation of the driving of the vehicle;
- detecting fulfillment of at least one of the first condition and the second condition;
- initiating the blocking of the actuation element for controlling the longitudinal guidance of the vehicle within the predefined position limits as a function of the variable representing the degree of automation of the driving of the vehicle and the first condition; and
- initiating suspension of the blocking of the actuation element for controlling the longitudinal guidance of the vehicle as a function of the variable representing the degree of automation of the driving of the vehicle and the second condition.

\* \* \* \* \*